US012766410B2

(12) United States Patent
Fung et al.

(10) Patent No.: US 12,766,410 B2
(45) **Date of Patent: *Oct. 20, 2026**

(54) SELECTIVE INDICATION OF OFF-SCREEN OBJECT PRESENCE

(71) Applicant: Riot Games, Inc., Los Angeles, CA (US)

(72) Inventors: Kam-Wing Fung, Los Angeles, CA (US); Li Jia Tan, Los Angeles, CA (US); Brian Carter Feeney, Sherman Oaks, CA (US); Christina Norman, Los Angeles, CA (US)

(73) Assignee: RIOT GAMES, INC., Los Angeles, CA (US)

( * ) Notice: Subject to any disclaimer, the term of this patent is extended or adjusted under 35 U.S.C. 154(b) by 196 days.

This patent is subject to a terminal disclaimer.

(21) Appl. No.: 18/766,230

(22) Filed: Jul. 8, 2024

(65) Prior Publication Data

US 2024/0359096 A1 Oct. 31, 2024

Related U.S. Application Data

(63) Continuation of application No. 17/866,033, filed on Jul. 15, 2022, now Pat. No. 12,029,980, which is a (Continued)

(51) Int. Cl.
*A63F 13/53* (2014.01)
*A63F 13/355* (2014.01)
(Continued)

(52) U.S. Cl.
CPC ............ *A63F 13/53* (2014.09); *A63F 13/355* (2014.09); *A63F 13/58* (2014.09); *A63F 13/847* (2014.09)

(58) Field of Classification Search
CPC ...... A63F 13/25; A63F 13/355; A63F 13/426; A63F 13/50; A63F 13/52; A63F 13/525;
(Continued)

(56) References Cited

U.S. PATENT DOCUMENTS 6,280,323 B1 8/2001 Yamazaki et al.
6,409,597 B1 * 6/2002 Mizumoto .............. A63F 13/10 463/31

(Continued)

FOREIGN PATENT DOCUMENTS

CN 101872241 A 10/2010
EP 0844580 B1 7/2007

(Continued)

OTHER PUBLICATIONS

Office Action received for European Application No. 21867766.4, mailed on Oct. 8, 2024, 6 pages.

(Continued)

*Primary Examiner* — Omkar A Deodhar
(74) *Attorney, Agent, or Firm* — Shook, Hardy & Bacon L.L.P.

(57) ABSTRACT

Systems, methods, and media are provided for the selective indication of the presence of off-screen objects in the shared gaming environment of a multiplayer game played on a mobile device. The shared gaming environment can include a game space and a plurality of objects located at various places of the game space. The player may view a portion of the game space via a screen view presented by the mobile device. The screen view can be bordered by a frame area that includes a portion of the game space that is outside of the screen view. Based on a predetermined rule set, the presence of an object that is located within the frame area can be selectively indicated within the screen view by a visual indicator, such as an icon. The visual indicator can be assembled from a library of elements to visually communicate contextually relevant information to the player.

20 Claims, 8 Drawing Sheets

Related U.S. Application Data continuation of application No. 17/019,096, filed on Sep. 11, 2020, now Pat. No. 11,395,967.

(51) Int. Cl.
*A63F 13/58* (2014.01)
*A63F 13/847* (2014.01)

(58) Field of Classification Search
CPC .. A63F 13/5258; A63F 13/53; A63F 13/5378; A63F 13/58; A63F 13/847; A63F 2300/30; A63F 2300/6646; A63F 2300/6653; A63F 2300/6661; A63F 2300/6669; A63F 2300/6684
See application file for complete search history.

(56) References Cited

U.S. PATENT DOCUMENTS

| | | | | |
|---|---|---|---|---|
| 7,454,715 | B2 * | 11/2008 | Chen | A63F 13/57 701/538 |
| 8,512,115 | B2 | 8/2013 | Namba et al. | |
| 11,395,967 | B2 * | 7/2022 | Fung | A63F 13/92 |
| 12,029,980 | B2 * | 7/2024 | Fung | A63F 13/5372 |
| 2004/0150675 | A1 * | 8/2004 | Chen | A63F 13/803 715/854 |
| 2006/0040738 | A1 | 2/2006 | Okazaki et al. | |
| 2009/0221368 | A1 | 9/2009 | Yen et al. | |
| 2011/0130182 | A1 | 6/2011 | Namba et al. | |
| 2015/0031421 | A1 | 1/2015 | Jo et al. | |
| 2015/0231509 | A1 | 8/2015 | Mcmain et al. | |
| 2019/0057431 | A1 | 2/2019 | Pareek | |
| 2019/0057531 | A1 | 2/2019 | Sareen et al. | |

FOREIGN PATENT DOCUMENTS

| | | | |
|---|---|---|---|
| JP | 08-229238 | A | 9/1996 |
| WO | 2018/157375 | A1 | 9/2018 |

OTHER PUBLICATIONS

Anonymous, "Zaxxon—Wikipedia" , Aug. 7, 2020, Retrieved from the Internet:URL:https://en.wikipedia.org/w/index.php?title=Zaxxon&oldid=971687408 [retrieved on Dec. 8, 2023].

* cited by examiner

SELECTIVE INDICATION OF OFF-SCREEN OBJECT PRESENCE

CROSS-REFERENCE TO RELATED APPLICATIONS

This non-provisional patent application claims the benefit of priority to U.S. patent application Ser. No. 17/866,033, entitled "Selective Indication of Off-Screen Object Presence," filed on Jul. 15, 2022, which claims the benefit of priority to U.S. patent application Ser. No. 17/019,096, entitled "Selective Indication of Off-Screen Object Presence," filed on Sep. 11, 2020 and issued as U.S. Pat. No. 11,395,967, each of which are incorporated by reference herein in its entirety.

TECHNICAL FIELD

Aspects hereof relate to displaying information associated with off-screen objects in a video game.

BACKGROUND

Video games provide entertainment, competition, and intellectual stimulation for players. In a vast majority of video games, communicating information to a player that is relevant to the player's situation is critical to player enjoyment. As such, the development, implementation, and functionality of graphical elements in a game's user interface (UI) are important. Traditional video games (e.g., those played on a desktop or laptop) can take advantage of input devices (e.g. keyboard or mouse) and relatively large display areas to facilitate communication of information to a player. However, the comparatively small display area of mobile devices (e.g., smartphones, tablets, and the like) presents challenges for effectively communicating information to a player. Said another way, the compact and shared input/display hardware of traditional mobile devices can limit the effectiveness of traditional gaming UI elements.

BRIEF SUMMARY

Aspects hereof describe system and methods for the selective display of an informational icon indicating the presence of an off-screen character in a multiplayer game. The icon is selectively displayed to a player when each element of a rule set is satisfied and can be dynamically modified with contextually relevant information as in-game events occur. For an illustrative example, in a multiplayer online battle arena (MOBA) a player on a red team can be shown an icon indicating that a character controlled by a blue team player is located just off-screen when the blue team player's character is not obscured by the red team's fog-of-war (e.g., is visible to the red team). The icon can include visual representations of the character's identity, the character's hit points, a direction, or many other pieces of information relevant to the player.

DESCRIPTION OF THE DRAWINGS

The present invention is described in detail herein with reference to the attached drawing figures, wherein.

DETAILED DESCRIPTION

Figure 1:
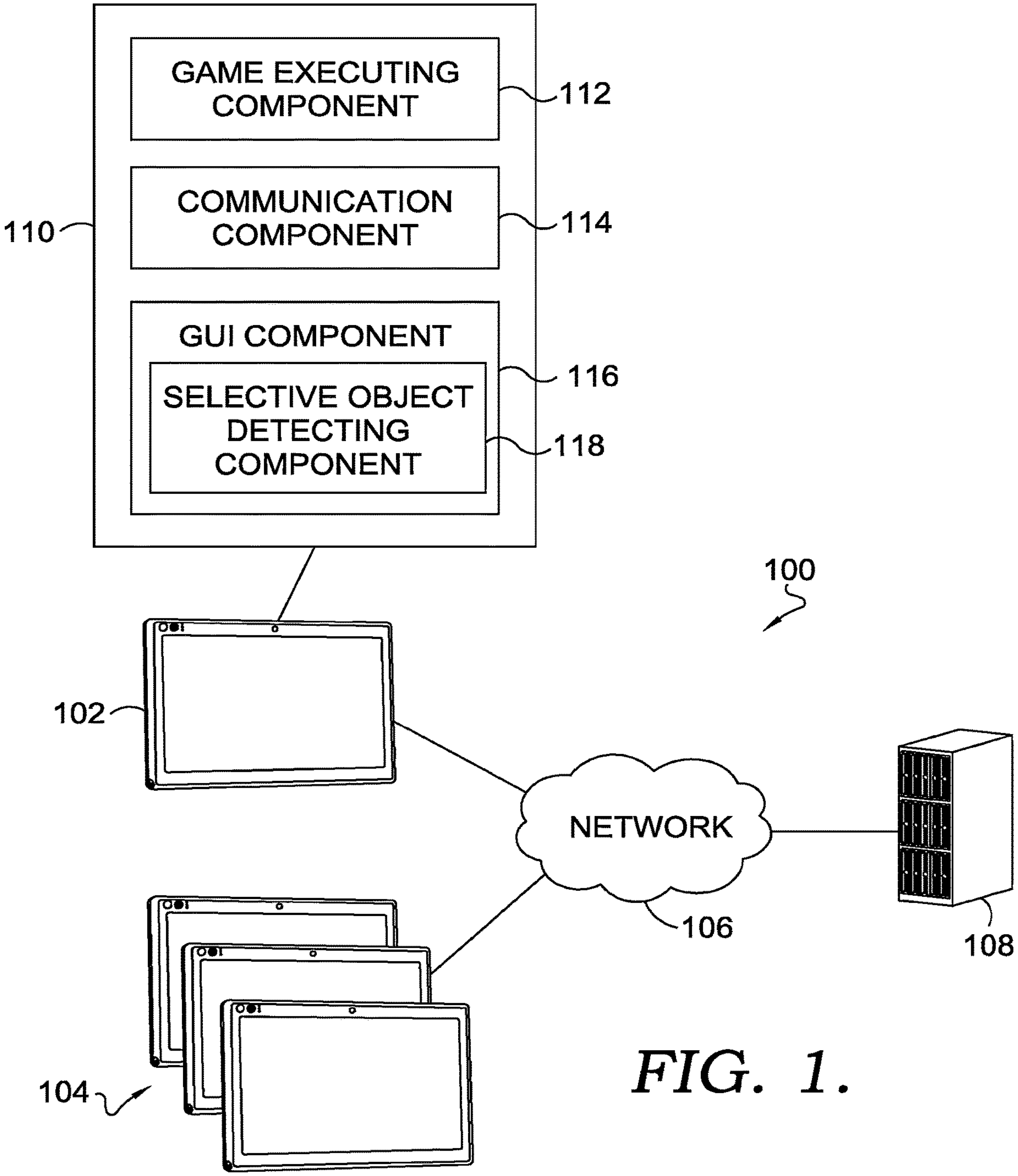
FIG. 1 depicts an example of a multi-device system for multiplayer mobile gaming, in accordance with exemplary aspects hereof.

The ability to rapidly gather information and rapidly react can be a key component to a player's success or failure in a video game. Competitive players of multiplayer online battle arena (MOBA) such as Riot's® League of Legends® commonly input commands in excess of 100 commands a minute. These commands may include information gathering, character (e.g., a Champion) movement, character actions (e.g., attacks or skills), and navigation about the game's map. Similarly, the ability of a video game to communicate information to the player can be a key component of the video game's success or failure. Few people enjoy playing a video game where the player can lose because the game's design restricts access to information until a loss is all but guaranteed.

Improvements to network bandwidth, computer processing, and battery capacity have dramatically increased the demand for mobile games with the depth and sophistication previously reserved to the traditional gaming systems (e.g., a desktop or laptop). Mobile gaming devices and consoles (e.g., Sony's® PlayStation® line of consoles, Microsoft's® Xbox® line of consoles, Nintendo's® Switch® line of consoles, Google's® Stadia® line of consoles, and so forth) provide unique challenges for effectively communicating information to a player. For example, the physical dimensions of the display included in many mobile devices is significantly smaller than the displays used by traditional gaming systems. The smaller display reduces the amount of the world the game can display at any point in time and reduces the amount of the display that is available for communicating information to the player via the game's user interface (UI).

Additionally, a significant number of mobile game devices and consoles have a limited set of native player input channels. For example, in many mobile gaming devices the display is coexistent with a touch-based input channel (e.g., a resistance or capacitance touch screen display). A few other physical buttons may exist, but typically those are reserved for device controls (e.g., volume up, volume down, power, and so forth). Traditional video games (e.g., those played on a desktop or laptop) can commonly omit information from the player's UI because the game can take advantage of the nearly ubiquitous keyboard and mouse or touchpad. For example, the combination of a mini-map, mouse buttons, and keyboard buttons can enable a player to quickly view multiple locations in the game's world and return to a view centered on the player's character. A player can gather information about the state of the game at the press of a button, return, and begin acting on the information within moments. In contrast, a mobile devices touch screen display can make rapid information gathering extremely difficult. Similarly, the relatively limited number of buttons of a console controller may make rapid information gathering extremely difficult.

Accordingly, aspects hereof provide systems and methods that selectively generate visual indicators, such as UI icons, in a video game that indicate the presence of off-screen objects. The UI icon can be adapted to provide contextually relevant information to a player of a game. For example, in a mobile or console MOBA, the UI icon can provide a warning that an enemy champion is just off-screen but still dangerously close to the player. The placement of the UI icon can indicate the direction of the enemy champion relative to the currently displayed portion of the map. Additionally, the UI icon can include a representation of the dangerously close enemy champion that informs the player which enemy champion is approaching (e.g., the enemy champion, Garen). The UI icon can communicate a plurality of other pieces of important information. For instance, the UI icon could communicate that Garen is facing in a specific direction (e.g., potentially closing the distance to the player), is using an ability, or has nearly full health, by way of non-limiting example.

The UI icon can be selectively displayed to a player (i.e., a user) based on a predetermined rule set. For example, the UI icon associated with Garen may be displayed to the player when Garen is in an otherwise visible portion of the map. In other words, the icon indicating that Garen is dangerously close to the player (i.e., the user's avatar) may only appear if Garen is not obscured from visibility. The rule set can also control the shape and size of the object detection frame that surrounds the displayed portion of the map. As such, the UI icon can facilitate visual communication of contextually relevant information to a player, even in circumstances where a device the player is using restricts the player's ability to see or gather the information as quickly and as easily as traditional gaming systems. Moreover, appropriate display of the UI icon may provide this information to the player without the need for significantly simplified strategic and tactical game mechanics. In other words, the selectively displayed visual indicator can, at least partially, compensate for the limitations of traditional mobile devices that previously hindered development of games with the fast and complex gameplay common in traditional video games.

As used herein, the term "object" refers to a player-controlled character, a computer-controlled character, or any other element of the gaming environment capable of interaction with a player. Computer-controlled characters are commonly referred to as a "bot", "non-player character" (NPC), "minion", or "mob" depending on the genre of the game. Illustrative examples of other elements of the gaming environment include structures and items.

The term "shared gaming environment" refers to the objects and game space of a game. The game space of a game is commonly referred to as an "instance", "map", "world", "level", or "board" depending on the genre of the game. For example, it is contemplated that the game space can be a persistent world (such as those of massive multiplayer online role playing games (MMORPG)), a session-based instance in a persistent world (such as a raid, player-versus-player arena, or player-versus-environment arena in an MMORPG), or a session-specific instance of a world (such as a battle royale map, real-time strategy map, MOBA map, or similar maps).

The term "screen view" refers to a portion of the shared gaming environment that a player is viewing. Said another way, a screen view is the sub-section of the shared gaming environment that is displayed to a particular player at a particular moment.

Turning to FIG. 1, an example network environment 100 is provided, in accordance with some aspects described herein. The depicted example network environment 100 includes a player's mobile device 102, a plurality of other mobile devices 104, network 106, and server 108. Generally, network environment 100 facilitates and enables multiple players of a mobile video game to play in a shared gaming environment. The shared gaming environment can take any form. For example, the shared gaming environment can be an instance of a persistent massive multiplayer online game or an instance of a session-specific multiplayer online game. Each player can use a particular mobile device to, among other things, control their character or avatar within the shared gaming environment.

Mobile devices 102, 104 generally facilitate a player's (i.e., user of the device) interaction with a shared gaming environment. For example, a mobile device can display the screen view of the shared gaming environment and the game's user interface. Additionally, the mobile device can convert player input into commands that control the screen view or the player's character. A mobile device can facilitate this interaction by executing an application stored in computer-readable media that allows a player to join the shared gaming environment. The application may include operational modules that can utilize a combination of hardware, firmware, and computer executable instructions that facilitate a player interaction with a shared gaming environment. The application may include any number of other gaming elements that facilitate joining the shared gaming environment, such as account login, matchmaking, character selection, chat, marketplace, and so forth. An illustrative example of such an application includes, but is not limited to, Riot's League of Legends: Wild Rift®.

For example, as depicted in FIG. 1, the operational modules of the application 110 associated with mobile device 102 may comprise a game executing component 112, a communication component 114, and a graphical user interface (GUI) component 116. The game executing component 112 can be configured for executing a game associated therewith, such as MOBA games described herein. In some embodiments, executing the game may include displaying a dynamic screen view, such as the screen views described herein in reference to FIGS. 3, 4, and 5. The communications component 114 can be configured for network communications between the mobile device 102, mobile devices 104, server 108, or any combination thereof via a network 106.

GUI component 116 can be programmatically configured to facilitate displaying the screen view and various interactable features of the game, such as menus, virtual joysticks, icons, and so forth. In some aspects, the GUI component 116 includes a selective object detecting component 118. The object detecting component 118 can display a visual indication (i.e., icon), which corresponds to an object in the shared gaming environment that is off-screen, within the screen view based on a programmatically predefined rule set. An illustrative rule set can result in the display of an icon corresponding to rival characters (e.g., champions controlled by a player on a different team than that of the player associated with mobile device 102), when the rival character is within a frame area surrounding the screen view, and the rival character is located within a visible area of the game space for the player associated with the mobile device 102.

Further, in some aspects the object detecting component 118 dynamically modifies the displayed icon, or elements thereof, based information communicated by the mobile device 104 or server 108 that relates to the object that corresponds to the displayed icon. For example, object detecting component 118 can move the icon within the screen view based on information indicating that the position of rival character has changed location within the frame area. For another example, object detecting component 118 can adjust an element of the icon associated with the rival character's current health based on information indicating that the rival character has been damaged or healed. For another example, object detecting component 118 can add, modify, or remove an element of the icon associated with the rival character to indicate an action that effected the rival character, or an action taken by the rival character.

Continuing, each mobile device communicates with the other mobile devices, server 108, or any combination thereof via network 106. In this regard, the mobile devices can be any mobile computing device that communicates by way of, for example, a WIFI, 3G, 4G, 5G, or 6G network. A mobile device can comprise some or all of the components of computing device 850 as discussed in regard to FIG. 8. The mobile devices can take a variety of forms, such as a tablet, a mobile phone, a smart phone, a personal digital assistant, or any other device capable of communicating with other devices by way of a network. Makers of mobile devices 102, 104 include, for example, Google, Research in Motion, Samsung, Apple, Nokia, Motorola, Microsoft and the like.

Network 106 generally facilitates communication between the mobile devices 102, 104 and server 108. As such, network 106 can include access points, routers, switches, or other commonly understood network components that provide wired or wireless network connectivity. In other words, Network 106 may include multiple networks, or a network of networks, but is depicted in a simple form so as not to obscure aspects of the present disclosure. By way of example, network 106 can include one or more wide area networks (WANs), one or more local area networks (LANs), one or more public networks, such as the Internet, one or more private networks, one or more telecommunications networks, or any combination thereof. Where network 106 includes a wireless telecommunications network, components such as a base station, a communications tower, or even access points (as well as other components) may provide wireless connectivity. Networking environments are commonplace in enterprise-wide computer networks, intranets, and the Internet. Accordingly, network 106 is not described in significant detail herein.

Server 108 generally facilitates hosting a multiplayer game for mobile devices 102, 104. In some embodiments, the server 108 is coupled, directly or indirectly, to a database for facilitating the storage and querying of records corresponding to a plurality of game play instructions, actions, objects (e.g., virtual game pieces/characters, weapons, buildings, etc.), maps, settings, or any combination thereof. The database includes, among other things, a relational database or similar storage structure accessible by the server 108. In accordance with embodiments described herein, the database stores a plurality of records that each corresponds to game play instructions, actions, objects, maps, graphic libraries, settings, or any combination thereof.

In some aspects, the server 108 includes a web server for hosting a website accessible by any of the mobile devices 102, 104 a data server for supporting an application of any of the server 108, or a combination of both via network 106. The hosted website or data server can support any type of website or application, respectively, including those that facilitate live game play. The server 108 further processes relationships between the mobile devices 102, 104, such as tracking which mobile device are associated with a particular team or tracking the actions of each object in a shared gaming environment. In various embodiments, the server 108 communicates actions commanded via one or more of the mobile devices 102, 104, or at least a portion thereof, to one or more of the other mobile devices 102, 104 for presentation thereon via user interfaces or the like. In some aspects server 108 can be a component of mobile devices 102, 104.

Figure 2A:
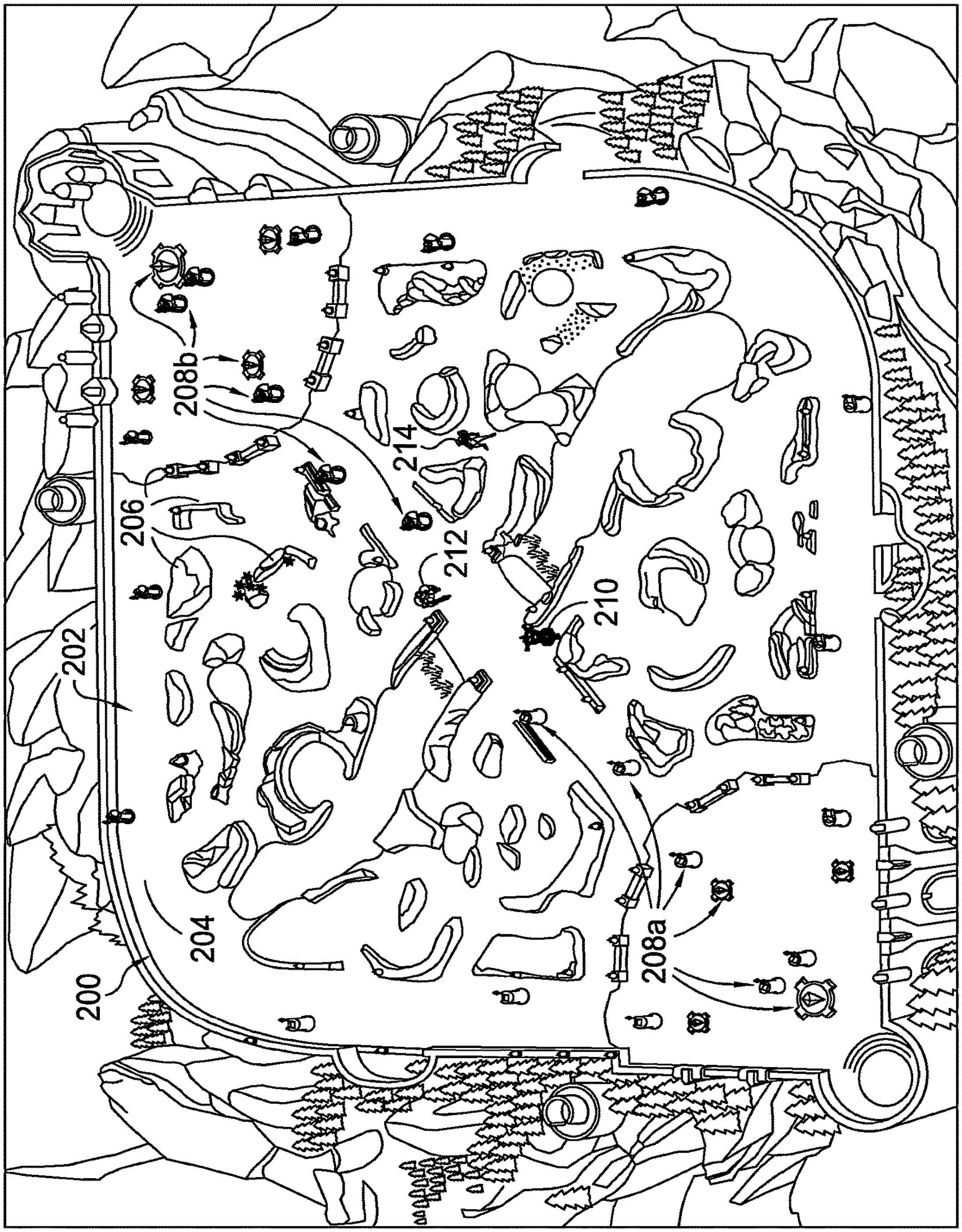
FIG. 2A depicts an overhead view of a shared gaming environment including a game space and objects, in accordance with aspects hereof.
Figure 2B:
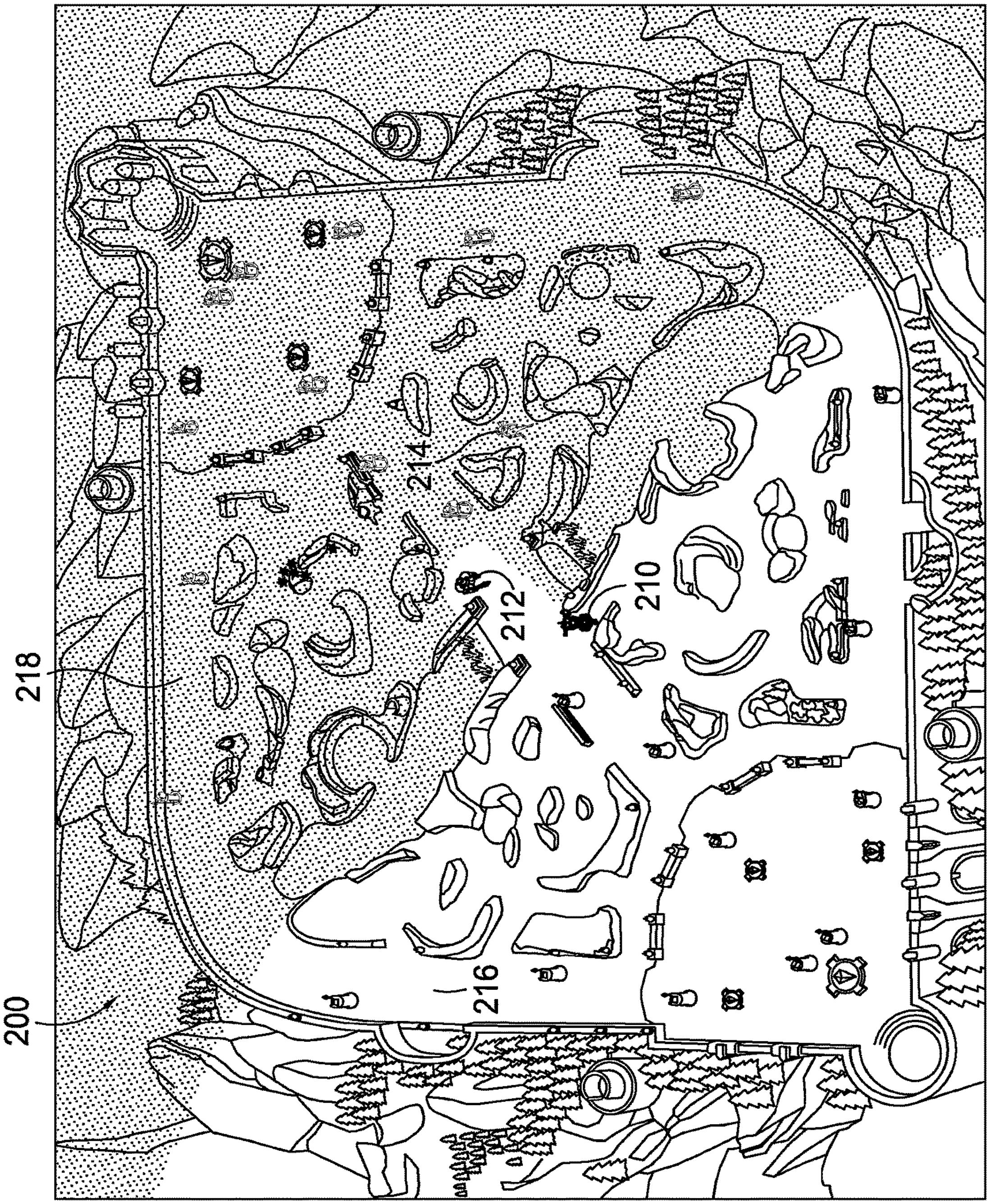
FIG. 2B depicts the overhead view of the shared gaming environment including a game space with visible and obstructed areas and objects, in accordance with aspects hereof.

Turning to FIGS. 2A and 2B, an overhead perspective view of an example shared gaming environment 200 is depicted, in accordance with aspects described herein. As mentioned above, a shared gaming environment can take a variety of forms depending on the game. For the sake of clarity the examples discussed hereafter are provided in the context of a session-specific instance of a MOBA game unless explicitly stated otherwise. At the start of a session two opposing teams are placed in opposite corners of a game space. Each team includes at least one player-controlled character. Each character may have a plurality of properties associated with it. The properties can include maximum health, current health, orientation, status, and any other property relevant to the game.

Additionally, each character can have associated skills that effect the other characters. For example, a particular character may have a skill that damages, or imposes a status effect on, a rival character. Additionally, or alternatively, the particular character may have a skill that heals or "buffs" an allied character. The skill's effect may be applied automatically when triggered by the player. Alternatively, the skill's effect may be applied to the target character only if the skill collides with the target character. These skills may require manual aiming by the player (commonly referred to as "skill shots"). Each team also includes periodically generated computer-controlled minions. Additionally, a set of structures positioned at various locations in the game space are associated with each team. Each team scouts, defends against, and engages with the other team's characters, minions, and structures. The session ends when one team destroys a specific structure in the opposing team's base or a team surrenders.

The game space includes visible areas and obstructed areas (commonly referred to as "fog of war"). The visibility of a specific location in the game space can vary by team. Said another way, a particular area of the game space can be a visible area for the first team and an obstructed area for the second team. Obstructed areas can be revealed (e.g., converted, at least temporarily, into visible areas) by objects. In other words, an object can provide vision (i.e., visibility) at the object's location and the surrounding region of the game space.

The amount of vision provided by an object (i.e., the size and shape of the area it reveals) can vary by object type, location, or a combination of both. For example, a player character can provide a first amount of vision, a tower structure can provide a second amount of vision, a ward object can have a third amount of vision, a minion object can have a fourth and so on. For another example, the locations altitude relative to the surrounding area can impact the object's vision. Similarly, other geographic features of the game space (such as walls, mountains, or other impenetrable features) can alter the object's vision. As such, the visible areas and obstructed areas dynamically shift as objects move about the game space.

In more detail, FIG. 2A depicts an overhead perspective view of shared gaming environment 200 at a particular moment during game play. The particular moment is a time after the start of the session and before the end of the session. The shared gaming environment 200 includes the game space 202 and a plurality of objects, such as character 210, rival characters 212, 214, and buildings 208*a*, 208*b*. The game space 202 can include geographic features, such as walls 206 and navigable areas 204. In the example aspect, character 210 is a player character associated with a first team of two opposing teams. Character 210 is controlled via a player's interaction with a mobile device, such as mobile device 102 of FIG. 1. In contrast, rival characters 212, 214 are player characters associated with the second team of the two opposing teams. Rival character 212 is controlled via a second player's interactions with a mobile device, such as one of the plurality of mobile devices 104. Similarly, rival character 214 is controlled via a third player's interactions with another mobile device, such as another one of the plurality of mobile devices 104.

Turning to FIG. 2B, depicted are some aspects of game space 202 that includes the visible area 216 and the obstructed area 218. Specifically, FIG. 2B representative of the first team's vision (i.e., the team associated with character 210) at the particular moment. As depicted in FIG. 2B, rival character 212 is within the visible area 216. Rival character 214 is within the obstructed area 218. In other words, at the moment depicted, the first team's vision includes rival character 214; but, rival character 212 is hidden (obscured or obstructed) by the first team's fog-of-war. Those skilled in the art will understand that many other objects can exist in the shared gaming environment 200. For the sake of clarity, description and discussion of these objects is omitted here.

Figure 3:
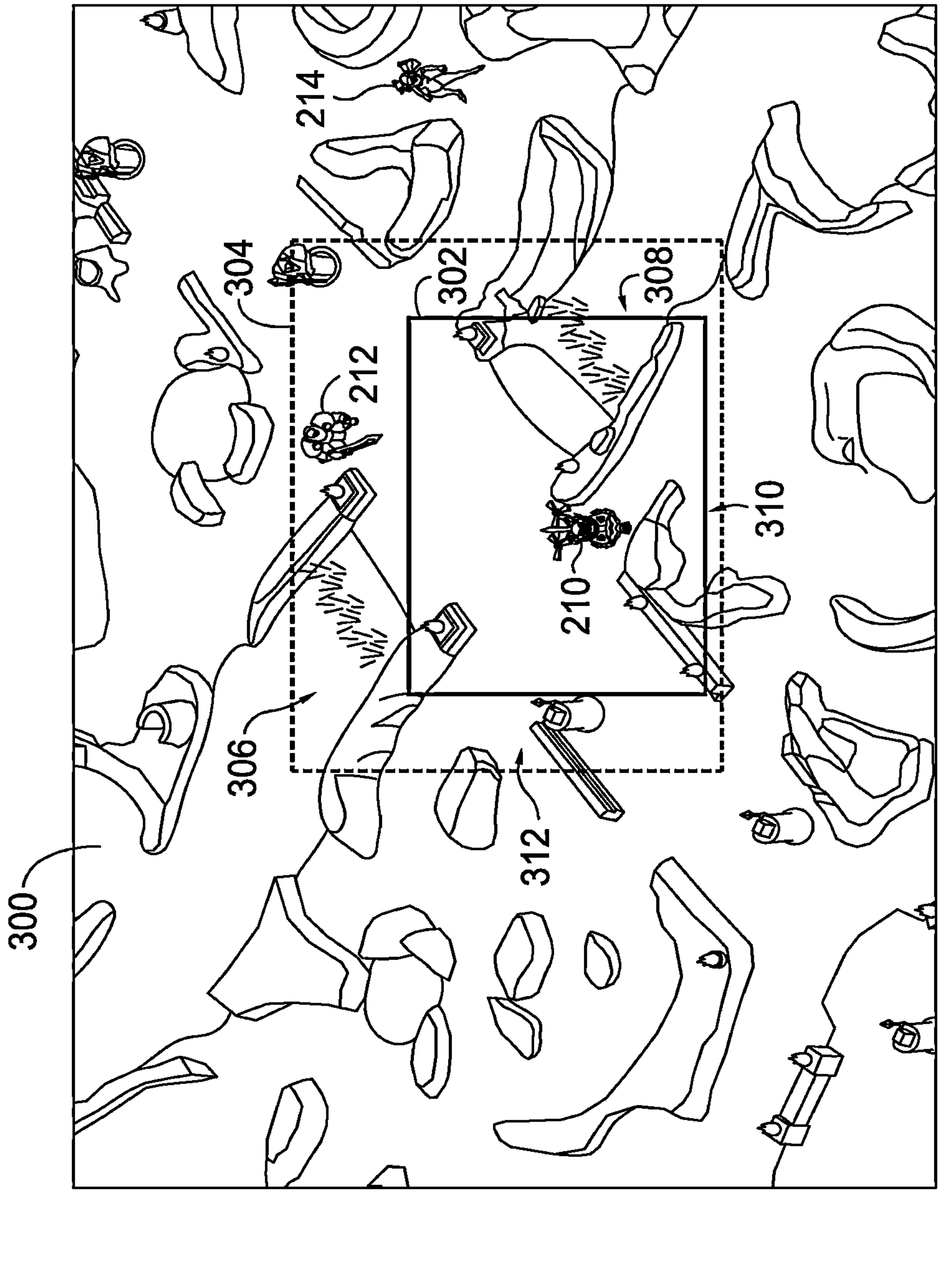
FIG. 3 depicts an enlarged area of the shared gaming environment including a screen view and frame area, in accordance with aspects hereof.

Generally, FIG. 3 depicts an enlarged area of the shared gaming environment including a screen view and a frame area in accordance with aspects described herein. A screen view represents the portion of a shared gaming environment displayed to a player via mobile device. A screen view can be presented in any number of ways. For example, in the example aspect the screen view 302 is presented from a $3^{rd}$ person isometric perspective of the shared gaming environment 200. In other words, the player views a shared gaming environment from approximately 45° (e.g., an angle between 25°-65°) angle of rotation, from an overhead perspective. In other aspects, a screen view could be presented in a $1^{st}$ person perspective, a $3^{rd}$ person overhead perspective, or a $3^{rd}$-person side view. In other words, the perspective of the screen view can be centered or off-set. A centered perspective can be thought of as viewing the shared gaming environment down an axis toward an origin point in the game space or from a vector originating from the character. An off-set $3^{rd}$ person perspective can be thought of as viewing the shared gaming environment from a non-axial coordinate point toward the origin or another coordinate point.

A screen view can include a plurality of dimension parameters. For example, a screen view can have a vertical dimension and a horizontal dimension. The dimensions can be a measure of the mobile device's display (e.g., the number of pixels in the mobile device's display), the measure of the screen view's resolution as rendered by a particular mobile device, or a predetermined distance in the game space.

A frame area represents an area surrounding the screen view. In other words, a frame area borders the screen view and includes a portion of the shared gaming environment outside of a screen view. The frame area can be centered on the screen view or off-center from the screen view. The frame area's size and shape can be defined by rules included in the game's application. In some aspects, the shape of the frame area corresponds to the shape of the screen view. In other aspects, the shape of the frame area is defined by the game application independent of the screen view. Said another way, the frame area can include rules for a top-side, a bottom-side, a left-side, and a right-side. Each of the sides can be of the same or different sizes. In some aspects, the size of each side can be defined as a percentage of the screen view's corresponding dimension. For example, the top-side (e.g., top-side 306) can be about 10% of the vertical dimension of the screen view. Said differently, the top-side can extend from the border of the frame area and the screen view by a number of pixels corresponding to about 10% of the pixels in the vertical dimension of the mobile device's display, screen view, or of the predetermined distance in the game space. Similarly, bottom-side (e.g., bottom-side 310) can be about 15% of the vertical dimension of the screen view. The left-side (e.g., left-side 312) and the right-side (e.g., right-side 308) can be about 6% of the horizontal dimension of the screen view.

In more detail, FIG. 3 depicts an enlarged area 300 of the shared gaming environment 200 including a screen view 302 and frame area 304. The example depicted in FIG. 3 corresponds to the same moment depicted in FIGS. 2A and 2B. In other words, screen view 302 represents the portion of the shared gaming environment 200 displayed to the player via mobile device 102 at the moment depicted in FIGS. 2A and 2B. Although the screen view 302 includes character 210 (e.g., the character the player is controlling) at the particular moment depicted, this may be incidental. In other words, it is contemplated that a screen view may be "locked" on the corresponding player's character or may be dynamically movable via player inputs to the mobile device 102.

Continuing, frame area 304 is off-center from the screen view 302. At the moment depicted in FIG. 3, frame area 304 includes rival character 212. Rival character 212 is located inside the top-side of frame area 304 and is facing roughly toward character 210. However, rival character 212 is outside screen view 302. The enlarged area 300 also includes rival character 214. Rival character 214 is located outside screen view 302 and outside frame area 304.

Figure 4:
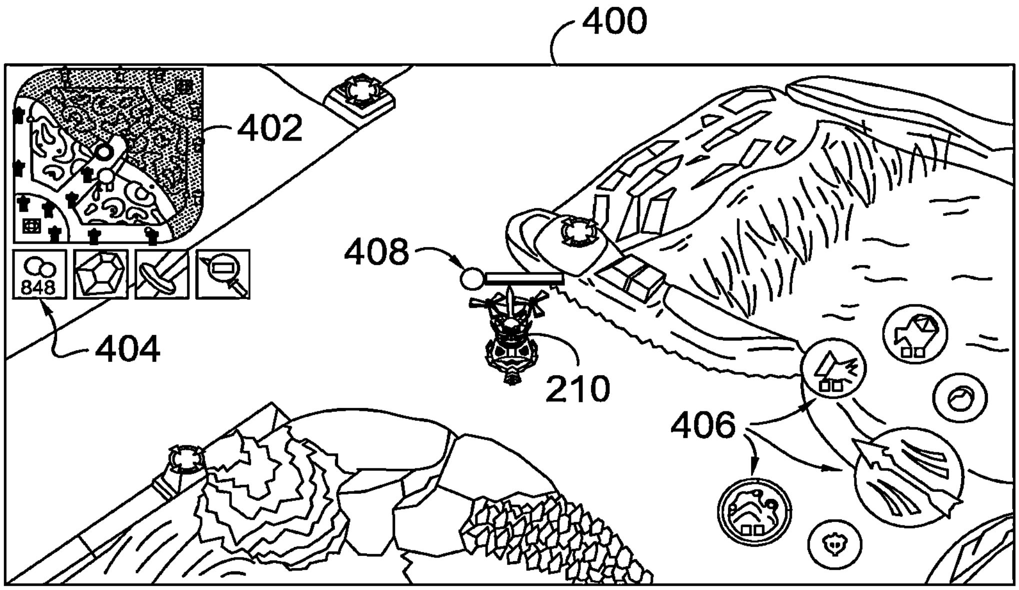
FIG. 4 depicts a screen view of the shared gaming environment including a portion of the game space, in accordance with aspects hereof.

FIG. 4 depicts screen view 400 including a player UI and a character, such as character 210. Screen view 400 is representative the portion of the shared gaming environment 200 displayed via a mobile device, such as mobile device 102, at a moment in the game play different from that depicted in FIGS. 2A, 2B, and 3 from the perspective of the player associated with character 210. For example, screen view 400 could be before or after the moment depicted in FIGS. 2A, 2B, and 3. In this moment, rival character 212 is outside of the frame area associated with screen view 400, in obstructed area of the game space (such as obstructed area 218), or a combination of both.

A player UI includes representations of information designed to communicate information to the player and receive input from the player. It can include a plurality of icons, text, or buttons. The player UI can be overlaid on the portion of the shared gaming environment displayed in the screen view. For example, the player UI of screen view 400 includes a mini-map 402, item icons 404, action icons 406, and a health bar 408 corresponding to the health of character 210 at this other moment. The mini-map 402 can display information about the location of visible objects (i.e., objects located in a visible area of the game space). The item icons 404 can include information about objects held by character 210, controlled by character 210, or affecting character 210. Action icons 406 can include buttons that activate skills of character 210. Each button can include a visual representation of the corresponding skill. When selected by the player, the action icons 406 trigger the character to perform the corresponding skill. Those skilled in the art will understand that a player UI can vary widely by game and thus some player UIs include more, fewer, or different icons, text, or buttons.

Figure 5:
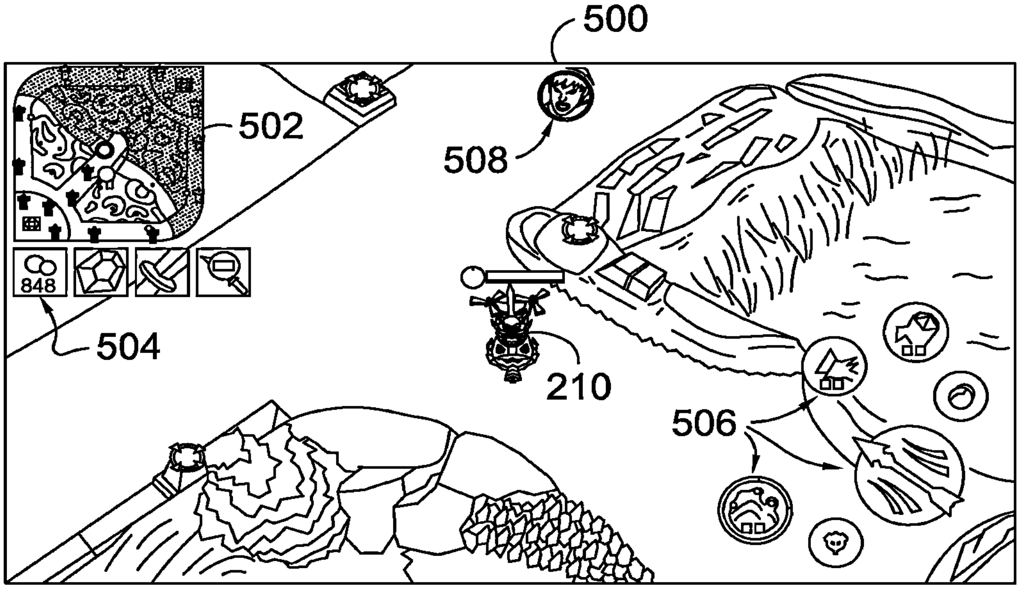
FIG. 5 depicts another screen view of the shared gaming environment including a portion of the game space and a selectively displayed visual indication of an off-screen object, in accordance with aspects hereof.

FIG. 5 depicts screen view 500 including an icon 508 representative of an object detected off-screen. Screen view 500 corresponds to the same moment depicted in FIGS. 2A, 2B, and 3 from the perspective of the player associated with character 210. As such, screen view 500 represents the portion of the game space presented to the player via the display of a mobile device, such as mobile device 102, at the moment depicted in FIGS. 2A, 2B, and 3. Similar to screen view 400, the player UI of screen view 500 also includes a mini-map 502, item icons 504, action icons 506, and so forth.

The screen view 500 also includes the icon 508. An indicator icon, such as icon 508, provides information about an off-screen object that is located within the frame area. For example, the information can identify the off-screen object, the approximate location of the off-screen object relative to the screen view, the status of the off-screen object, or any combination thereof. Each piece of information can be communicated by the location of the icon, an element of the icon, or combination of elements of the icon. For example, and with reference to FIGS. 3 and 5, the position of the icon 508 can be dynamically adjusted to be a point within screen view 302, 500 proximate the border of screen view 302, 500 and the frame area 304 closest to the off-screen object (e.g., rival character 212). In another aspect, the position of the icon 508 can be dynamically adjusted within the screen view 302, 500 to a location adjacent the border of screen view 302, 500 along a straight line connecting a point (e.g., the center) of the screen view 302, 500 and the location of a rival character 212. As a rival player moves rival character 212, or the player moves screen view 500, the position of the icon can be updated. In this way, the location of icon 508 provides dynamic information to the player associated with character 210 indicating the off-screen location of a rival character, such as rival character 212.

The icon 508 can include multiple elements. The elements of icon 508 can correspond to a property associated with the off-screen object represented by icon 508. The properties can include maximum health, current health, orientation, status, identity, and any other property relevant to the game. The elements can include graphics, colors, symbols, text, or the like to visually communicate the corresponding property to the player. For example an element can depict a graphical representation of the object based on the identity of the object. In this way, the graphical representation element of icon 508 can visually communicate the identity of a rival character, such as that rival character 212 is Garen. An element can include a directional indicator associated with the orientation of the object (e.g., the direction the object is facing). Another element can communicate the object's status or change in status. Additionally, the elements of icon 508 can dynamically change to provide visual updates to the player. For example, elements can be emphasized when the icon is first displayed in screen view 500. The elements can change to a neutral emphasis after a predetermined period of time. In this way, the dynamic changes to the elements of icon 508 can visually communicate that rival character 212 just entered the frame area bordering screen view 500 or has been present for at least the predetermined period of time.

In some aspects, an indicator icon, such as icon 508, can be in the same "layer" of the player UI as other components of the player UI. Alternatively, an indicator icon can be in a different layer (i.e., a layer above or a layer below) the other components of the player UI. For example, icon 508 can float above other player UI elements such that icon 508 can be superimposed over mini-map 502, one or more item icons 504, or any other player UI elements. For another example, icon 508 can float below other player UI elements such that icon 508 can be obscured by mini-map 502, one or more item icons 504, or any other player UI elements.

Figure 6A:
FIGS. 6A-6D depict example elements of a selectively displayed visual indication of an off-screen object, in accordance with aspects hereof.

FIGS. 6A-6D depict a plurality of illustrative element combinations of icon 508. Element set 600 of FIG. 6A depicts an illustrative example of an emphasized icon element set 600 and includes a graphic element 602 and a ring element 604. The graphic element 602 depicts an image designed visually communicate the identity of the object, such as rival character 212 from FIG. 5. In an aspect, the depiction may be a static image, video image, animated image representative of the object sored in a library associated with the games application. Graphic element 602 can include various effects that emphasize the element, such as a glow. The ring element 604 is configured to visually emphasize the icon, such as icon 508 from FIG. 5. For example, ring element 604 can be a visually distinct color and include various effects that emphasize the element, such as a glow. The design and configuration of each element of element set 600 may vary depending on the game.

Figure 6B:
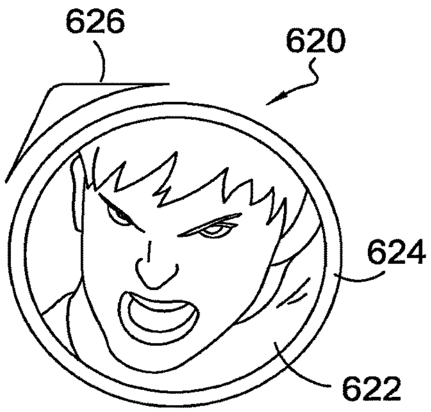

FIG. 6B depicts an illustrative example of a neutral element set 620 including a graphic element 622, a ring element 624, and a directional element 626. The graphic element 622 depicts an image designed to visually communicate the identity of the object, such as rival character 212 from FIG. 5. In an aspect, the depiction may be a static image, video image, animated image representative of the object sored in a library associated with the games application. In other words, there may be many different graphic elements available for inclusion in an assembled icon. A particular object can be assigned a particular image or graphic element. For example, a graphic element may be associated with each potential player character, each non-player character, each building, or any other object of the game. The ring element 624 can be a color associated with the object, such as rival character 212 from FIG. 3, such as blue or red. In some aspects, the ring element 624 can be a predetermined color associated with a user preference, such as a particular color selected if a user preference indicates the player is color blind. Directional element 626 depicts an image designed to visually communicate the orientation of the object, such as rival character 212 from FIG. 3. As such, the location and orientation of directional element 626 in relation to the other elements of the element set 620 can vary. Similarly, the design and configuration of each element of element set 620 may vary depending on the game.

Figure 6C:
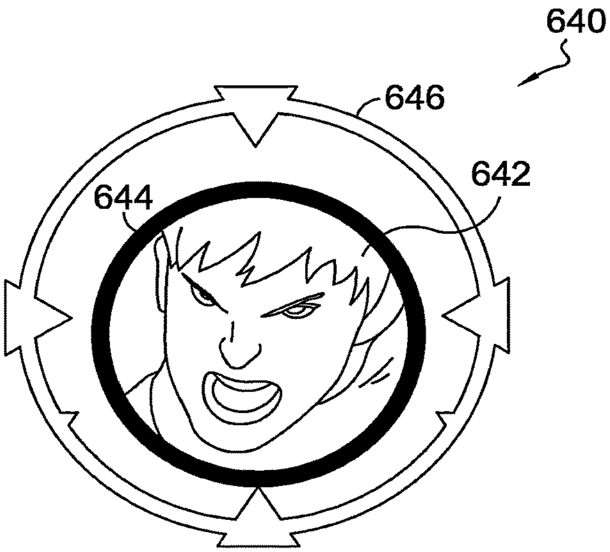

FIG. 6C depicts an illustrative example of an action effect element set 640 including a graphic element 642, a ring element 644, and an action element 646. The graphic element 642 depicts an image designed to visually communicate the identity of the object, such as that rival character 212 from FIG. 3 is Garen. In an aspect, the depiction may be a static image, video image, animated image representative of the object sored in a library associated with the games application. The ring element 644 can be a color (e.g., blue or red) associated with the object, such as rival character 212 from FIG. 3. In some aspects, the ring element 644 can be a predetermined color associated with a user preference. In some aspects, the ring element 644 is configured to visually emphasize the icon (e.g., icon 508 of FIG. 5), such as via a flash or pattern of flashes to communicate that an action damaged, or applied a change in status to, the object (e.g., rival character 212 of FIG. 3). In some aspects, the action element 646 depicts an image designed to visually communicate the particular skill or action that hit, or the particular status applied to, the rival character 212. In other words, there may be many different action elements depicting each action or skill available for inclusion in an assembled icon. A particular action element can be assigned a particular action, skill, or particular status effect. For example, an action element may correspond with a basic attack, a skill, or a status (e.g., stun, cripple, airborne, disarm, charm, frighten, taunt, ground, root, silence, drowsy, asleep, slow, suppress, blind, or any other status effect of the game). The design and configuration of each element of element set 640 may vary depending on the game.

Figure 6D:
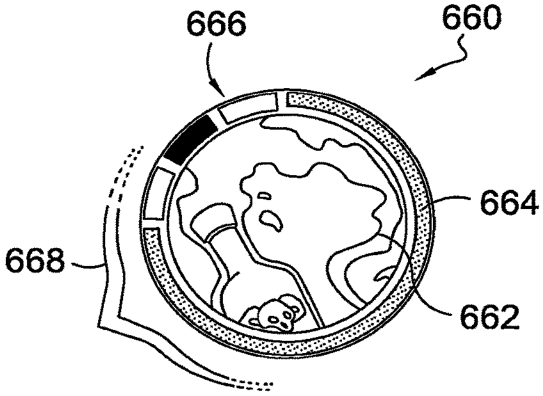

FIG. 6D depicts an illustrative example of a skill action element set 660 including a graphical element 662, a ring element 664, and directional element 668. The graphic element 662 depicts an image designed to visually communicate the identity of a skill used by the object, such as a skill used by rival character 212 from FIG. 3. In an aspect, the depiction may be a static image, video image, animated image representative of the skill sored in a library associated with the game's application. The ring element 664 can be a color associated with the object, such as blue or red for rival character's 212 from FIG. 3. In some aspects, the ring element 664 include sections 666 that indicate the number of skill charges remaining, the number of applied charges, or the level of the skill. The directional element 668 depicts an image to visually communicate the directionality of the cast skill. In other words, the directional element 668 provides an indication of the path the skill cast by the object (e.g., rival character 212 from FIG. 3) is going to travel or is traveling. The design and configuration of each element of element set 660 may vary depending on the game.

Continuing with general reference to FIGS. 6A-6D, any number of elements can be combined to form an element set, such as element sets 600, 620, 640, and 660 can be stored in an element library associated with a server (e.g., server 108) or a mobile device (e.g., mobile device 102 or mobile devices 104). Elements of the depicted element sets can be provided for display in other combinations than the examples provided. For example, graphic element 602, ring element 604, and directional element 626 can be combined to form an element set. As such, the icon can be dynamically assembled to include visual indications of information relevant to the player of the game via the mobile device.

Additionally, effects can be applied to elements to communicate additional information. For example, a semi-transparent masking effect can be included with graphic element 602, 622, 642, or 662 that communicates the objects relative health. In other words, while the object (e.g., rival character 212 from FIG. 3) is at full health the semi-transparent masking effect may fully cover the graphic element, wherein the top of the graphic element reflects 100% health and the bottom represents 0% health. As the object (e.g., rival character 212 from FIG. 3) is hit with damaging actions, the corresponding reduction to the object's (e.g., rival character 212 from FIG. 3) health can be reflected as a proportional change in the semi-transparent masking effect.

Figure 7:
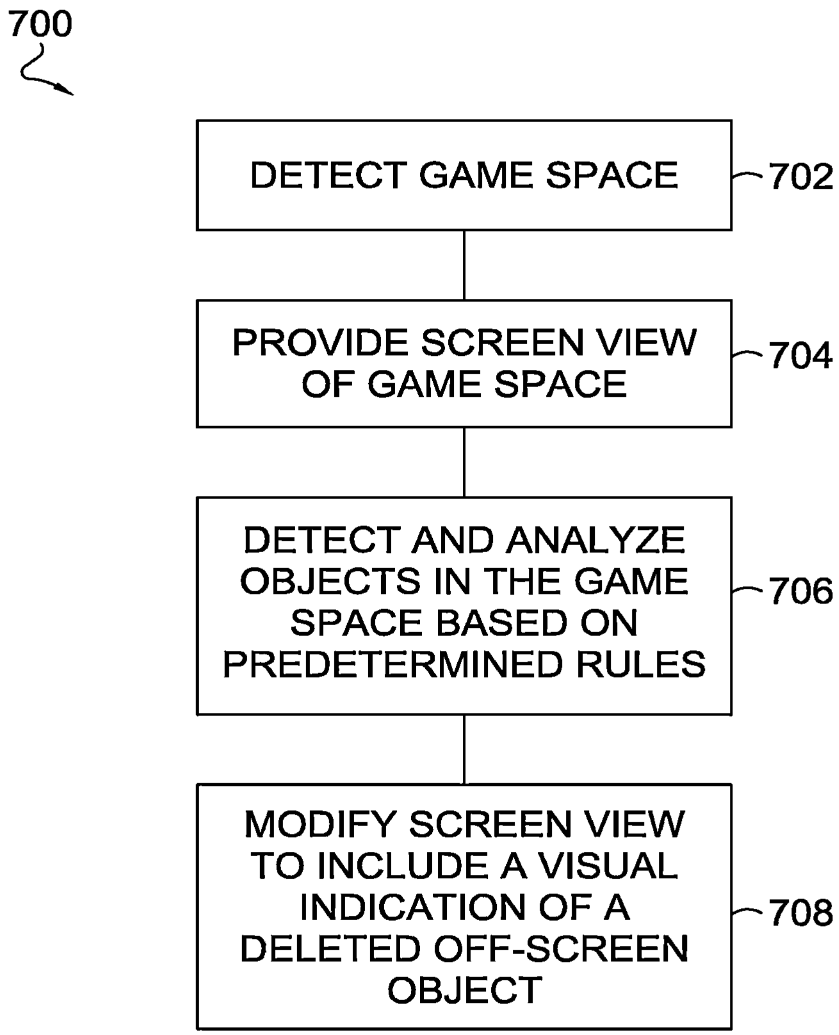
FIG. 7 depicts an example method for the selective display of a visual indication of an off-screen object, in accordance with aspects hereof.

FIG. 7 depicts an illustrative method 700 for selective display of an indication of the presence of an off-screen object, in accordance with aspects described herein. Aspects of method 700 can be carried out by a processor executing instructions stored in computer-readable media. The processor can carry out the instructions using any combination of hardware, firmware, or software directly or indirectly accessible by the processor. For example, some aspects of method 700 can be a subroutine or module of the game application 110 executed by mobile device 102 or server 108. For another example, some aspects of method 700 can be a rule set defined by the game application's GUI component 116 to selectively identify and generate UI icons indicating the presence of off-screen objects. However, these methods can additionally or alternatively be executed by any one system, or any combination of systems, including, but not limited to, those described herein.

Some aspects of method 700 begin with block 702. At block 702, a game space, such as game space 202 from FIG. 2, is identified. The game space can represent a map for a shared gaming environment, such as shared gaming environment 200 from FIG. 2. As such, the game space can be identified based on data communicated to a mobile device from a server hosting the shared gaming environment or by a game application executed by the mobile device.

At block 704, a screen view of the game space is provided for display by a mobile device. The screen view can be determined based on an initial default screen view define by the game application and any subsequent inputs to the player UI corresponding to navigation within the game space. Further the screen view can be determined based on the dimensions of the mobile device's display. In other words, a screen view (e.g., screen view 302 from FIG. 3) can be determined based on the size of mobile device's (e.g., mobile device 102 from FIG. 1) display and the player's interaction with the player UI. A processor associated with the mobile device (e.g., mobile device 102 from FIG. 1) can provide instructions to the display associated with the mobile device (e.g., mobile device 102 from FIG. 1) that cause the display to render the screen view (e.g., screen view 302 from FIG. 3).

At block 706, off-screen objects can be detected and analyzed based on a predetermined rule set to determine whether the detected objects qualify for selective display to the player. Detection of off-screen objects can be facilitated by information held in a mobile devices memory, by information communicated to a mobile device by another mobile device or server associated with the same shared gaming environment that includes the game space. By way of example, the visible area 216 and the obstructed area 218 of game space 202 from FIG. 2B can be determined based on information communicated from mobile devices 104 or server 108 from FIG. 1. Similarly, the location of objects can be determined based on information communicated from the mobile devices (e.g., mobile devices 104) or a server (e.g., server 108). Further, the mobile devices or server may communicate the location of objects, such as rival character 212 and rival character 214 from FIG. 2A, to the player's mobile device (e.g., mobile device 102). Similarly the object class can be communicated to a mobile device (e.g., mobile device 102). For example, mobile devices 104 or server 108 may communicate that rival character 212 and rival character 214 are player characters on a different team than character 210 to mobile device 102. Additionally, the frame area's (e.g., frame area 304 from FIG. 3) size and shape can be communicated to the mobile device (e.g., mobile device 102) by other mobile devices (e.g., mobile devices 104) or a server (e.g., server 108).

The information associated with each object in the game space can be analyzed by the mobile device (e.g., mobile device 102) to determine whether the object satisfies the predetermined rule set. The rule set can include any predetermined criteria based on the game. For example, the predefined conditions can require that the object is in the frame area surrounding the screen view. For another example, the predefined conditions can require that an object belongs to the rival player character class of objects, that the object is in a visible area of the game space, and that the object is within a frame area surrounding the local screen view. By way of example, mobile device 102 can determine that the rival character 212 is within the visible area 216, that rival character 212 belongs to the rival player character class, and is within frame area 304. Thus, rival character 212 satisfies the illustrative rule set. In contrast, mobile device 102 can determine that rival character 214 is within the obstructed area 218, that rival character 214 belongs to the rival player character class, and is outside of the frame area 304. Accordingly, rival character 214 does not satisfy the illustrative rule set. In some aspects, the rule set can be applied to the objects iteratively (e.g., all objects are evaluated with the first rule, only the objects that satisfy the first rule are evaluated by a second rule, only objects that satisfy the second rule are evaluated by a third rule, and so forth) or independently (e.g., all objects are evaluated with each rule independent of the object satisfying any other rule). In some aspects, once at least one object is detected that satisfies the predetermine rule set is detected, method 700 may progress to block 708.

At block 708, the screen view of the game space is modified to include a visual indication of the detected off-screen object. The visual indication can be an icon configured to communicate information about the off-screen object to the player, such as icon 508 from FIG. 5. The visual indication can be assembled from one or more icon elements, such as those discussed in regards to FIGS. 6A-6D, based on information about the detected off-screen object communicated by the other mobile devices or a server (e.g., mobile devices 104 or server 108 from FIG. 1). For example, a mobile device 104 associated with rival character 212 can communicate properties corresponding to rival character 212 to each mobile device and server associated with the same shared gaming environment. The properties may include maximum health, current health, orientation, status, identity, and any other property relevant to the game. The mobile device can receive the properties and assemble an icon from one or more icon elements based on the properties. For example, GUI component 116 from FIG. 1 can identify elements associated with some or all of the properties and assemble an icon from the identified elements.

The assembled icon can be generated in the player UI of the screen view. The icon can be positioned in the player UI proximate the border between the screen view and the frame area. The position of the icon in the player UI can be based on the relative location of the object associated with the icon. In other words, the position of the icon can visually communicate the position of the off-screen object. Illustratively, as depicted in FIGS. 3 and 5, the icon 508 is positioned at the upper edge of the screen view 500 to visually communicate to the player using mobile device 102 that rival character 212 is located in the game space above screen view 500.

Further, each element of the assembled icon in the player UI can communicate additional information about the object to the player using a mobile device. For example, if the particular moment depicted in FIGS. 3, 5, represents the moment rival character 212 satisfied each rule of the rule set, then the assembled icon 508 may include emphasized icon element set 600. This can communicate to the player using mobile device 102 that the rival character 212 just came within a potentially dangerous range of character 210. Further, the assembled icon can communicate that rival character 212 is a particular character, in this case Garen.

For another example, if the particular moment depicted in FIGS. 3 and 5 represents a moment that is at least a predetermined time after the rival character 212 satisfied each rule of the rule set, the assembled icon 508 may include neutral icon element set 620. This can communicate to the player using mobile device 102 that the rival character 212 is within a potentially dangerous range of character 210 and has been within range for a period of time. Additionally, the assembled icon can communicate that rival character 212 is oriented in a specific direction. This may communicate to the player using mobile device 102 that the rival character 212 is approaching character 210, moving/facing away from character 210, or moving toward a different area of the game space 202.

For another example, if the particular moment depicted in FIGS. 3 and 5 represents a moment that one of character's 210 skills hit rival character 212, the assembled icon 508 may include an element of action effect element set 640. This can communicate to the player using mobile device 102 that a skill shot the player executed successfully hit rival character 212. Further, it can communicate to the player that rival character 212 has the status associated with the skill shot. For example, that the rival character 212 is stunned, crippled, airborne, disarmed, charmed, frightened, taunted, grounded, rooted, silenced, drowsy, asleep, slowed, suppressed, blinded, vulnerable, or any other status of the game.

For still another example, if the particular moment depicted in FIGS. 3 and 5 represents a moment that rival character 212 is using a skill, the assembled icon 508 may include an element of skill action element set 660. This can communicate to the player using mobile device 102 the skill used by rival character 212, the direction of the skill's target, the number of remaining charges, the number of applied charges, or the level of the skill.

In some aspects of method 700, the method can also include updating the visual indication of the detected off-screen object. The visual indication can be updated to reflect any changes to the object that have occurred from the particular moment to a subsequent moment. For example, if the location, current health, orientation, status, or any combination thereof has changed for the object (e.g., rival character 212 from FIG. 3) the visual indication is updated by the mobile device (e.g., mobile device 102 from FIG. 1). Method 700 can also include an update rule set that identifies conditions for particular visual indication updates. For example, a rule can control the updates to icon 508 if rival character 212 repeatedly enters and exits the frame area 304 within a predetermined interval. Illustratively, an update rule set may omit an emphasized icon when the rival character 212 reenters the frame area 304 for the third time within six seconds. Instead, the update rule set may indicate that a neutral icon should be assembled and displayed to the player.

Embodiments of the disclosure may be described in the general context of computer code or machine-useable instructions, including computer-useable or computer-executable instructions, such as program modules, being executed by a computer or other machine, such as a personal data assistant, a smartphone, a tablet PC, or other handheld device. Generally, program modules, including routines, programs, objects, components, data structures, and the like, refer to code that performs particular tasks or implements particular abstract data types. Embodiments of the disclosure may be practiced in a variety of system configurations, including mobile devices, consumer electronics, more specialty computing devices, or the like. Embodiments of the disclosure may also be practiced in distributed computing environments where tasks are performed by remote-processing devices that are linked through a communications network. In a distributed computing environment, program modules may be located in both local and remote computer storage media including memory storage devices.

Figure 8:
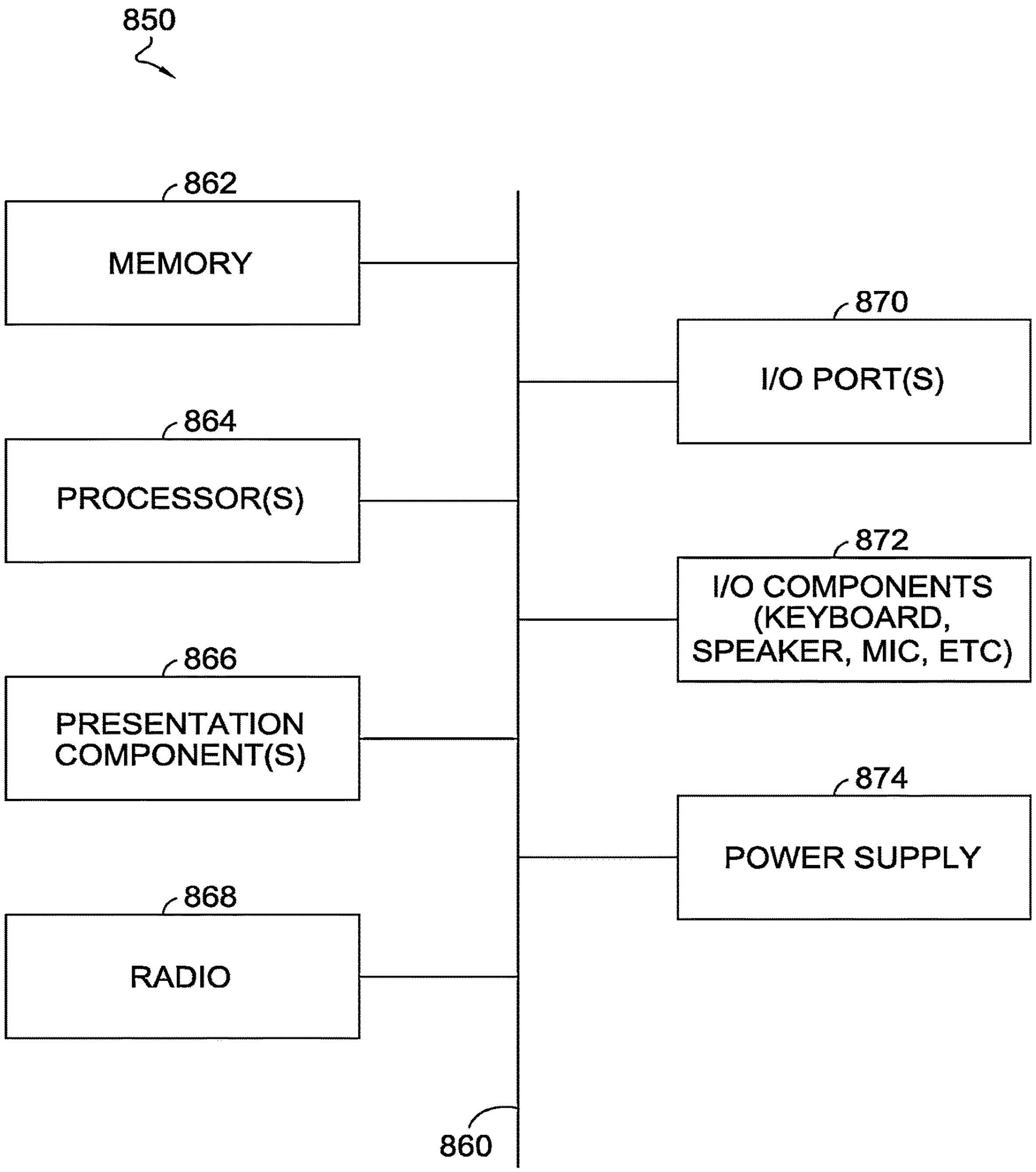
FIG. 8 depicts an example computing device, in accordance with aspects hereof.

With reference to FIG. 8, computing device 850 includes a bus 860 that directly or indirectly couples the following devices: memory 862, one or more processors 864, one or more presentation components 866, one or more input/output (I/O) ports 870, one or more I/O components 872, and an illustrative power supply 874. Bus 860 represents what may be one or more busses (such as an address bus, data bus, or combination thereof). Although the various blocks of FIG. 8 are shown with lines for the sake of clarity, in reality, these blocks represent logical, not necessarily actual, components. For example, one may consider a presentation component such as a display device to be an I/O component. Also, processors have memory. The inventors hereof recognize that such is the nature of the art and reiterate that the diagram of FIG. 8 is merely illustrative of an exemplary computing device that can be used in connection with one or more embodiments of the present disclosure. Distinction is not made between such categories as "workstation," "server," "laptop," "handheld device," etc., as all are contemplated within the scope of FIG. 8 and with reference to "computing device."

Computing device 850 typically includes a variety of computer-readable media. Computer-readable media can be any available media that can be accessed by computing device 850 and includes both volatile and nonvolatile media, removable and non-removable media. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program modules, or other data. Computer storage media includes, but is not limited to, RAM, ROM, EEPROM, flash memory or other memory technology, CD-ROM, digital versatile disks (DVDs) or other optical disk storage, magnetic cassettes, magnetic tape, magnetic disk storage or other magnetic storage devices, or any other medium which can be used to store the desired information and which can be accessed by computing device 850. Computer storage media does not comprise transitory signals per se. Communication media typically embodies computer-readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media, such as a wired network or direct-wired connection, and wireless media, such as acoustic, RF, infrared, and other wireless media. Combinations of any of the above should also be included within the scope of computer-readable media.

Memory 862 includes computer storage media in the form of volatile and/or nonvolatile memory. The memory may be removable, non-removable, or a combination thereof. Exemplary hardware devices include solid-state memory, hard drives, optical-disc drives, etc. Computing device 850 includes one or more processors 864 that read data from various entities such as memory 862 or I/O components 872. Presentation component(s) 866 presents data indications to a user or other device. Exemplary presentation components include a display device, speaker, printing component, vibrating component, and the like.

The I/O ports 870 allow computing device 850 to be logically coupled to other devices, including I/O components 872, some of which may be built in. Illustrative components include a microphone, joystick, game pad, satellite dish, scanner, printer, wireless device, etc. The I/O components 872 may provide a natural user interface (NUI) that processes air gestures, voice, or other physiological inputs generated by a user. In some instances, inputs may be transmitted to an appropriate network element for further processing. An NUI may implement any combination of speech recognition, touch and stylus recognition, facial recognition, biometric recognition, gesture recognition both on screen and adjacent to the screen, air gestures, head and eye tracking, and touch recognition associated with displays on the computing device 850. The computing device 850 may be equipped with depth cameras, such as stereoscopic camera systems, infrared camera systems, RGB camera systems, and combinations of these, for gesture detection and recognition. Additionally, the computing device 850 may be equipped with accelerometers or gyroscopes that enable detection of motion. The output of the accelerometers or gyroscopes may be provided to the display of the computing device 850 to render immersive augmented reality or virtual reality.

Some embodiments of computing device 850 may include one or more radio(s) 868 (or similar wireless communication components). The radio 868 transmits and receives radio or wireless communications. The computing device 850 may be a wireless terminal adapted to receive communications and media over various wireless networks. Computing device 850 may communicate via wireless protocols, such as long term evolution ("LTE"), code division multiple access ("CDMA"), global system for mobiles ("GSM"), or time division multiple access ("TDMA"), as well as others, to communicate with other devices. The radio communications may be a short-range connection, a long-range connection, or a combination of both a short-range and a long-range wireless telecommunications connection. When we refer to "short" and "long" types of connections, we do not mean to refer to the spatial relation between two devices. Instead, we are generally referring to short range and long range as different categories, or types, of connections (i.e., a primary connection and a secondary connection). A short-range connection may include, by way of example and not limitation, a Wi-Fi® connection to a device (e.g., mobile hotspot) that provides access to a wireless communications network, such as a WLAN connection using the 802.11 protocol; a Bluetooth® connection to another computing device is a second example of a short-range connection, or a near-field communication connection. A long-range connection may include a connection using, by way of example and not limitation, one or more of CDMA, LTE, GPRS, GSM, TDMA, and 802.16 protocols.

Although described in the context of a mobile game played on a mobile device, aspects hereof can facilitate selectively generating visual indicators, such as UI icons, that indicate the presence of off-screen objects in video games played on other devices. For instance in a particular aspect, mobile device (e.g., mobile device 102 or mobile devices 104 of FIG. 1) can be replaced by a console (e.g., Sony's® PlayStation® line of consoles, Microsoft's® Xbox® line of consoles, Nintendo's® Switch® line of consoles, Google's® Stadia® line of consoles, and so forth). Those skilled in the art will understand that, in such an aspect, a display may include a traditional television or computer display. Similarly, an input channel may include a wired or wireless controller. Advantageously, implementation of the aspects described herein in a console game can address some of the limitations associated with the relatively limited input options associated with console controllers.

Additionally, it is contemplated that some of the aspects described herein can be implemented in desktop or laptop based MOBA (e.g., League of Legends®), MMORPG, real-time strategy (RTS) game, or any other genre of game. Further, it is contemplated that some of the aspects described herein can be implemented in a cross-platform (e.g., traditional gaming systems and mobile devices in any combination) MOBA, MMORPG, RTS game, or any other genre of game. Said another way, the selectively generated visual indicators described herein can improve the capability of a video game to visually communicate information such that it may reduce the number of input commands used to gather information in traditional video games played on traditional gaming systems.

The subject matter of the technology described herein is described with specificity to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of the methods employed, the terms should not be interpreted as implying any particular order among or between various steps herein disclosed unless and except when the order of individual steps is explicitly described. Additionally, the term about is used here to account for variations of +10%. For example, about 15% refers to an inclusive range of 25%-5%.

We claim:

1. A computer implemented method for selectively displaying information related to off-screen objects in a multiplayer video game, the method comprising:

displaying a screen view of a game space for a player, the game space having a visible area and an obstructed area, wherein the screen view presents a portion of the game space and a mini-map representative of the game space, and objects within the obstructed area are not visible to the player;

detecting an off-screen object within a visible area of the game space, outside of the screen view, and visible within the mini-map; and generating a visual indication of the detected off-screen object to display in addition to the screen view.

2. The computer implemented method of claim 1, wherein the screen view presents an isometric view of the presented portion of the game space.

3. The computer implemented method of claim 2, wherein the off-screen object is detected based on the off-screen object being within a frame area of the game space that surrounds the screen view.

4. The computer implemented method of claim 1, wherein the visual indication includes a representation of the object.

5. The computer implemented method of claim 1, wherein the visual indication comprises a direction of the off-screen object relative to the screen view.

6. The computer implemented method of claim 1, wherein the visual indication of the detected off-screen object corresponds to a position of the detected off-screen object relative to the screen view.

7. The computer implemented method of claim 6, wherein the visual indication of the detected off-screen object is dynamically updated based on the position of the detected off-screen object relative to the screen view.

8. The computer implement method of claim 1, wherein the visual indication is displayed on a visual layer above the screen view.

9. The computer implement method of claim 1, wherein the off-screen object corresponds to a rival character in the video game.

10. A computerized system for selectively displaying information related to off-screen objects in a multiplayer video game, the system comprising:

one or more processors; and one or more computer storage media storing computer-usable instructions that, when used by the one or more processors, cause the one or more processors to:

display a screen view of a game space for a player, the game space having a visible area and an obstructed area, wherein the screen view presents a portion of the game space and a mini-map representative of the game space, and objects within the obstructed area are not visible to the player;

determine that an object in the game space is located within the visible area, is outside of the screen view, and is visible within the mini-map; and based on the determination, generate a visual indication of the object's location within the game space to display as an overlay to the screen view.

11. The system of claim 10, wherein the screen view presents an isometric view of the presented portion of the visible area.

12. The system of claim 10, wherein the object is within the visible area of the game space when it is visible in the mini-map.

13. The system of claim 10, wherein the visual indication includes a representation of the object.

14. The system of claim 10, wherein the visual indication of the object's location is dynamically updated based on an updated location of the object relative to the screen view.

15. The system of claim 10, wherein the off-screen object corresponds to a rival character in the video game.

16. A method for selectively displaying information related to off-screen objects in a multiplayer video game, the method comprising:

displaying a screen view of a game space and a mini-map representative of the game space, the game space including a visible area for a player and an obstructed area for the player, wherein the screen view corresponds to a portion of the game space, and objects within the obstructed area are not visible to the player;

responsive to a determination that an object in the game space is visible within the mini-map and is located outside of the screen view, generating a visual indication of the object's location relative to the screen view; and displaying the visual indication as an overlay to the screen view.

17. The method of claim 16, wherein the visual indication comprises a direction of the off-screen object relative to the screen view.

18. The method of claim 16, wherein the visual indication of the object's location is dynamically updated based on an updated location of the object relative to the screen view.

19. The method of claim 16, wherein the visual indication includes a representation of the object.

20. The method of claim 16, wherein the screen view presents an isometric view of the portion of the game space.

* * * * *